United States Patent
Byer et al.

[19]

[11] Patent Number: 6,064,512
[45] Date of Patent: May 16, 2000

[54] PATTERNED POLED STRUCTURE DEVICES HAVING INCREASED APERTURE SIZE, INCREASED POWER HANDLING AND THREE DIMENSIONAL PATTERNING CAPABILITIES

[75] Inventors: Robert L. Byer, Stanford; Robert C. Eckardt, Redwood City; Martin M. Fejer, Palo Alto; Lawrence E. Myers, Stanford, all of Calif.

[73] Assignee: The Board of Trustees of the Leland Stanford Junior University, Palo Alto, Calif.

[21] Appl. No.: 08/869,349

[22] Filed: Jun. 5, 1997

[51] Int. Cl.$^7$ ...................................................... G02F 1/355
[52] U.S. Cl. .......................................... 359/326; 385/122
[58] Field of Search ..................................... 359/326–332; 385/122; 372/21, 22

[56] References Cited

U.S. PATENT DOCUMENTS

| | | | |
|---|---|---|---|
| 4,865,406 | 9/1989 | Khanarian et al. | 385/122 |
| 5,064,265 | 11/1991 | Khanarian et al. | 359/332 X |
| 5,113,469 | 5/1992 | Hatakoshi et al. | 385/122 |
| 5,289,309 | 2/1994 | Delacourt et al. | 359/328 |
| 5,355,247 | 10/1994 | Byer et al. | 359/330 |
| 5,475,526 | 12/1995 | Byer et al. | 359/330 |
| 5,581,642 | 12/1996 | Deacon et al. | 385/15 |
| 5,640,480 | 6/1997 | Komine | 385/122 |

*Primary Examiner*—John D. Lee
*Attorney, Agent, or Firm*—Lumen Intellectual Property Services

[57] ABSTRACT

Devices for increasing the power handling capability through increased aperture size of patterned poled nonlinear optical material are disclosed. One embodiment employs a prism bonded to the top surface of a plate (a surface parallel to the plate) of poled material. The faces of the prism provide entrance and exit windows for light. Light enters the prism, enters the first surface of the plate at a small angle, reflects from the bottom surface of the plate and then exits the device through the prism exit window. The plate exerts a nonlinear effect on the light. Higher power handling is achieved because, compared to prior art techniques, the light is spread over a larger area in the poled plate. A second embodiment provides for the same advantages by bonding several plates to form a single unit. The plates are stacked, aligned, and bonded together. The result is a single unit with a larger aperture and therefore higher optical power handling capability than is possible with a single plate. Also, a stack of patterned plates provides the ability to construct nonlinear optical devices with three-dimensional poled patterns.

11 Claims, 7 Drawing Sheets

PATTERNED POLED STRUCTURE DEVICES HAVING INCREASED APERTURE SIZE, INCREASED POWER HANDLING AND THREE DIMENSIONAL PATTERNING CAPABILITIES

This invention was supported in part by grant no. N00014-941-0426 from the U.S. Navy. The U.S. Government has certain rights to the invention.

FIELD OF THE INVENTION

This invention relates to nonlinear optical devices such as frequency doublers and, more specifically, to devices made of patterned plates of nonlinear optical material such as $LiNbO_3$.

BACKGROUND OF THE INVENTION

Devices utilizing nonlinear optical effects have a number of applications such as up and down frequency converters, parametric oscillators and amplifiers. These devices are based on the nonlinear optical properties of certain nonlinear optical (NLO) materials. Three commonly used NLO materials are $LiNbO_3$, $LiTaO_3$ and KTP. In a frequency converter such as a frequency doubler, a bulk crystal of NLO material is cut and polished to allow input and output beams to propagate at a specific angle with respect to the crystal lattice. Frequency converted (e.g., doubled) light is created from the input beam. The relatively low conversion efficiencies of these devices, however, have limited their usefulness. Conversion efficiency is, among other factors, greatly affected by the coefficient of nonlinearity of the material used. The coefficient of nonlinearity is also very important for the other applications of NLO materials mentioned above.

It has been found that poling the crystal structure of such NLO materials can greatly enhance the desired nonlinear optical (NLO) effects. Poling consists of forming patterned regions within the NLO material that have predetermined molecular polarizations. This phenomenon has stimulated great interest in the development of patterned poled NLO material technologies. Periodically poled $LiNbO_3$, for example, exhibits a factor of 20 conversion efficiency improvement over bulk $LiNbO_3$ when used as a frequency converter. The other NLO material applications mentioned above are similarly affected. Patterned poled $LiNbO_3$ is discussed here because it has recently been developed to a level where it is useful for practical devices.

The problem is that patterned poled NLO materials are only available in very limited thickness, at least for the foreseeable future. Poled $LiNbO_3$, for example, is currently limited in thickness to 1 mm. This is a result of the best process known for making patterned poled $LiNbO_3$; electric field poling. Reference can be made to Myers et al., Journal of the Optical Society of America, 12(11), p.2102–2116 concerning electric field poling techniques. This process starts with a thin plate of single crystal $LiNbO_3$, perhaps 0.5 mm×10 mm×10 mm in size, and for this discussion, oriented horizontally. The optic axis is oriented perpendicular to the plane of the plate (vertical), an orientation commonly referred to as "Z-cut" in the art. An electrode pattern is lithographically fabricated on the top surface of the plate. For a periodically poled pattern as may be used in a frequency doubling device, the spatial period of the poling (and therefore the electrodes) may be from 2–30 microns. The electrodes are connected to a high voltage power source, which supplies an electric field across the plate in selected regions. The polarity of the applied electric field is selected to oppose the ferroelectric polarization of the material. When voltage is applied such that the electric field inside the plate exceeds the coercive field of the material, the domain polarity of the material between the electrodes will flip 180 degrees to reorient with the applied field. The accurately patterned metal traces provide accurate control over which regions will become domain inverted. The critical coercive field for domain inversion for $LiNbO_3$ is quite high at 21 KV/mm. This field is, unfortunately, close to the dielectric strength. When attempts are made to pole thicker plates of $LiNbO_3$, slight irregularities in the plate thickness or defects in the crystal cause dielectric breakdown, and destroy the sample. Even in cases where dielectric breakdown does not occur, the domain pattern fidelity in thick plates degrades because of the high aspect ratio that must be maintained through a thick crystal Similar effects limit the thickness of other patterned poled NLO materials. The electric field poling technique does have the great advantage of allowing precise patterns to be poled over a large surface area.

Bulk periodically poled $LiNbO_3$ with large apertures has been fabricated directly by modulating the crystal growth process, but it suffers from long range uniformity problems that significantly degrade device performance. Another disadvantage of this method is that it can only make one-dimensional patterns. This precludes the construction of improved and novel devices which can be constructed with higher dimensional domain inversion patterns. A further disadvantage of this technique is that the conditions required for domain modulation are detrimental to high quality crystal growth and compositional homogeneity.

Thicker plates are of interest because the greatest nonlinear effect is achieved when the interacting light beams propagate perpendicular to the optic axis, i.e., in the plane of the plate. Thus, the useful aperture of poled NLO devices is severely limited by the thickness of the poled plates. The small aperture also limits the optical power handling ability of a poled device because NLO material has a damage threshold. For $LiNbO_3$, for example, the damage threshold is $3J/cm^2$ for a 10 ns, 1064 nm optical pulse. Any increase in optical intensity (power/area) above this threshold will damage the NLO device. Thus, beams cannot simply be focused down to compensate for the small aperture of patterned poled NLO devices; damage will result. Since a process for producing accurate poling in thick bulk NLO materials does not currently exist, a scheme is needed for increasing the useful aperture of patterned poled NLO devices.

A number of methods exist for increasing the aperture of poled NLO material. The following discussion focuses on periodically poled plates because they are commonly used in laboratory NLO applications and are commercially available.

Using an elliptical beam shape to enter the edge of a poled plate increases the beam footprint which allows more power at a given intensity. A practical limit for the asymmetry of the major and minor axes of the elliptical beam is possibly 5:1 due to the difficulty of elliptical focusing. This increase is useful, but still will not meet power handling requirements in many applications. The elliptical beam profile may require elaborate beam shaping optics, though in some cases, the elliptical shape may actually match that of the laser pump source as in the case of a diode laser, for example.

Figure 1:
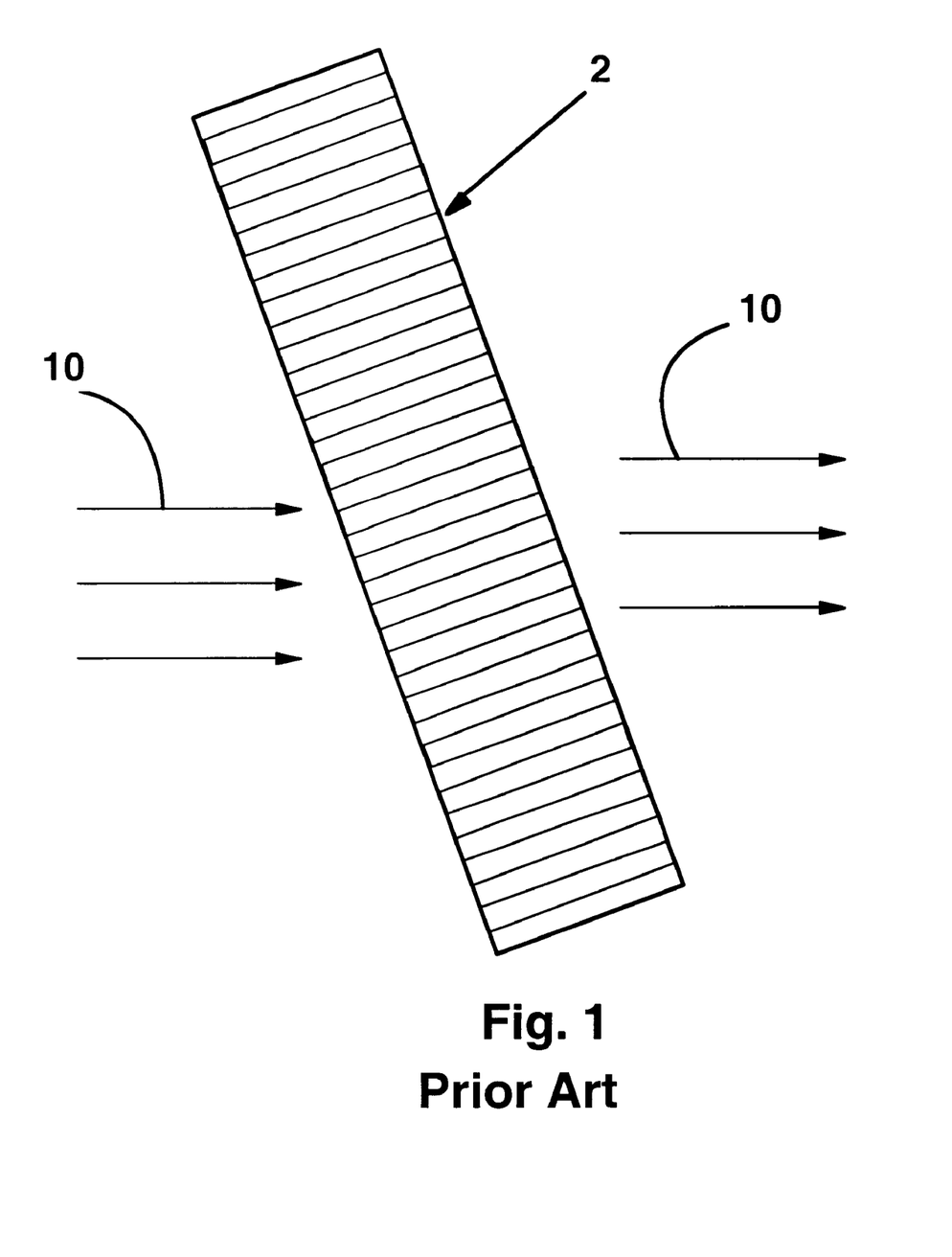
FIG. 1 (Prior Art) shows face pumping of a periodically poled plate.

FIG. 1 illustrates a possible arrangement called a face pumped geometry. This geometry provides the desired NLO effects but at significantly reduced efficiency compared to end pumping as in FIG. 3. When the plate is face pumped, the grating vector is not parallel with the beam, which results in decreased NLO effects. Also, the interaction length is now limited by the thin dimension of the plate. This further reduces the NLO effect. The smaller the angle between the grating vector and the beam, the less efficiency degradation. However, since NLO materials typically have high refractive indices, a larger external angle of incidence is required to achieve a given internal angle. The large angle of incidence results in high surface reflection losses.

Figure 2:
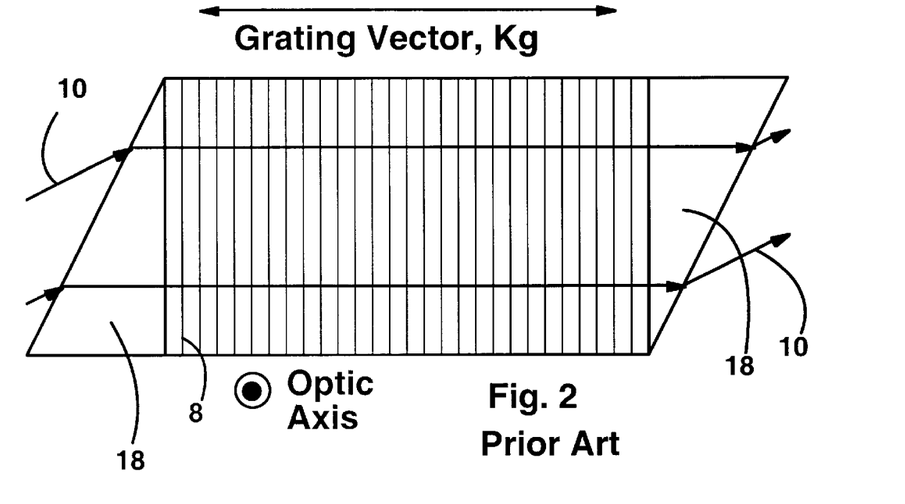
FIG. 2 (Prior Art) shows a periodically poled plate with prisms bonded to the end faces.

Another prior art solution is shown in FIG. 2. In this drawing, the plate is in the plane of the paper. This arrangement consists of wedged ends on the periodically poled plate, formed for example by cutting the ends at an angle or bonding prisms to the end faces (as shown), to expand the beam input side and recompress the beam on the output side. This method has the advantage of allowing the beam to travel parallel to the grating vector of the plate. A problem with this solution is that it only expands the incoming beam in one dimension, limiting the increase in aperture size. Further, the wedged surface increases the difficulty of aligning beams through the thin plate.

Another disadvantage of current methods of fabricating domain-patterned materials is that there is no capability for three-dimensional patterning. The techniques of growing bulk domain-patterned materials by modulating growth parameters allows the ability to modulate only in one dimension, i.e. along the growth axis. The techniques of electric field poling, which is the current favored approach to fabricating domain patterned materials, allows two-dimensional patterning because the electrode structure is formed by a lithographic mask design. Patterning in the third dimension is not possible because the domain pattern is constrained to follow the ferroelectric axis of the material, so the pattern defined by the surface electrode is reproduced through the depth of the material. The potential benefits of three-dimensional domain patterning can be inferred from the two-dimensional domain-patterned devices that have been successfully demonstrated in the current technical literature. The extension to three dimensions has not been demonstrated because of the unavailability of a device with three-dimensional patterned structures.

Laser rods with large apertures have been created by bonding together a number of smaller laser rods. These devices utilize lasing medium materials and not NLO materials. Plates of dissimilar NLO materials have been bonded to produce waveguide structures and quasi-phasematched structures. These devices do not provide for increased power handling capability and preclude the use of electric field patterning.

Therefore there is a need for novel structures providing increased aperture size, increased and three-dimensional patterning capability. Future applications of poled plates depend upon the development of such structures.

OBJECTS AND ADVANTAGES OF THE INVENTION

It is an object of this invention to provide increased aperture size in patterned poled nonlinear optical devices.

It is a further object of this invention to provide increased optical power handling capability in patterned poled nonlinear optical devices.

It is also an object of the present invention to provide three-dimensional patterning capability in patterned poled nonlinear optical devices.

SUMMARY OF THE INVENTION

These objects are achieved with the following structures:

A trapezoidal prism is bonded to the top surface of a patterned plate such that the prism faces can act as entrance and exit windows for light beams. Light entering one face of the prism enters the patterned plate at a grazing angle and reflects from the bottom surface of the plate (opposite the prism) by means of total internal reflection or direct reflection from a mirror. The light beam then exits the patterned plate and exits the prism through the exit window. In this arrangement, the light beam is distributed over a larger cross section of the patterned plate, which permits higher optical power handling. The reflection from the bottom surface provides for an increased path length, which is desirable for enhanced NLO effects. The aperture is larger compared to the aperture available when sending the light beam into the edge of the patterned plate, which is the conventional arrangement.

Possible reflection losses are an important consideration in the design of this device. The prism is important for reducing the amount of light that would be reflected (and wasted) if light were directly incident upon the patterned plate. By making the prism out of a material with the same index of refraction as the patterned plate, reflection losses from the prism-plate interface can be nearly eliminated. Reflection losses from the entrance and exit windows of the prism can be minimized by inserting the light at normal incidence or at the Brewster angle of the prism material. Anti reflection coatings applied to the prism faces can further reduce reflection losses.

Antireflection coatings can also be applied directly to the plate. If such a coating is applied to the top surface, the prism is not necessary and the light beam can enter and exit the plate at non-normal incidence with a minimum of reflection losses.

Another type of device can be made from a number of plates stacked and bonded together. Bonding can be done with optical cement, by optical contacting, or by diffusion bonding. The plates may be positioned to align the patterned poling in adjacent plates. This results in a thick device with poled regions throughout. The stacked ends are polished to provide entrance and exits windows for the light beam. The aperture size and therefore power handling capability are increased by a factor equal to the number of plates in the stack.

Three-dimensional patterning is also possible by designing the two-dimensional patterns in each plate such that a predetermined three-dimensional pattern is form when the plates are stacked.

Another device disclosed is a plate with its patterning rotated with respect to the plate. A plate with such rotated patterning exhibits enhanced nonlinear effects with light incident upon a face of the plate, as compared with an identically oriented nonrotated plate. Conventional patterned plates are severely limited in the degree of NLO effect they can impart to light incident upon their face. This is due to a geometrical consideration. Rotated patterning allows light incident upon the face of a plate to propagate at a smaller angle with respect to the grating vector of the poled patterns.

The invention will be better understood by reference to the following detailed description in connection with the accompanying drawings.

DETAILED DESCRIPTION

Figure 3:
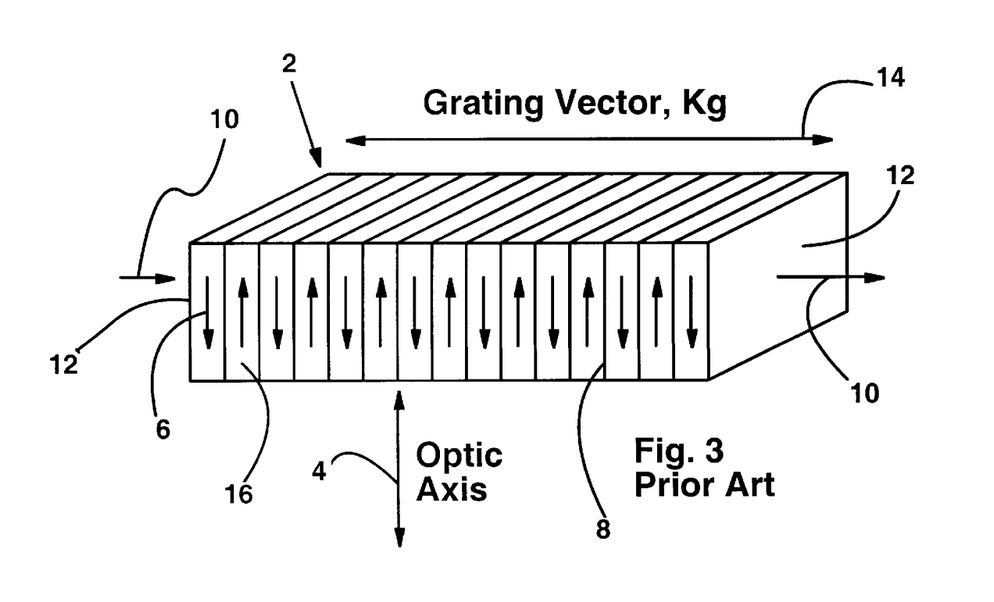
FIG. 3 is a more detailed view of a periodically poled plate.

In the following discussion, periodically poled plates as illustrated in FIG. 3 will be considered because they have a number of applications and are commercially available. Other poling patterns can be used to produce novel devices such as optical switches and waveguides. It will be obvious to one skilled in the art that the methods disclosed can be applied to plates with a variety of poling patterns and not just periodic patterns.

A side view of a periodically poled plate 2 is shown in FIG. 3. The plane of the plate is perpendicular to the optic axis 4. The alternating arrows 6 represent the alternating poled domain polarizations. The domain boundaries 8 are represented by lines. A light beam 10 is shown entering and exiting end faces 12 of the plate 2, parallel to a grating vector 14. Maximum nonlinear optical (NLO) effects are achieved when the light beam 10 and grating vector 14 are parallel, i.e., when the light beam 10 propagates perpendicular to the domain boundaries 8. A periodically poled plate 2 typically has a spatial period in the range from 2 to 30 microns, depending on the desired effect and the wavelength of light used. Thus, the individual poled domains 16 have thicknesses of 1 to 15 microns. Domain widths outside this range are possible and have practical applications. A plate 10 mm×10 mm×0.5 mm with a period of 20 microns will have 1000 separately poled domains 16.

Figure 4:
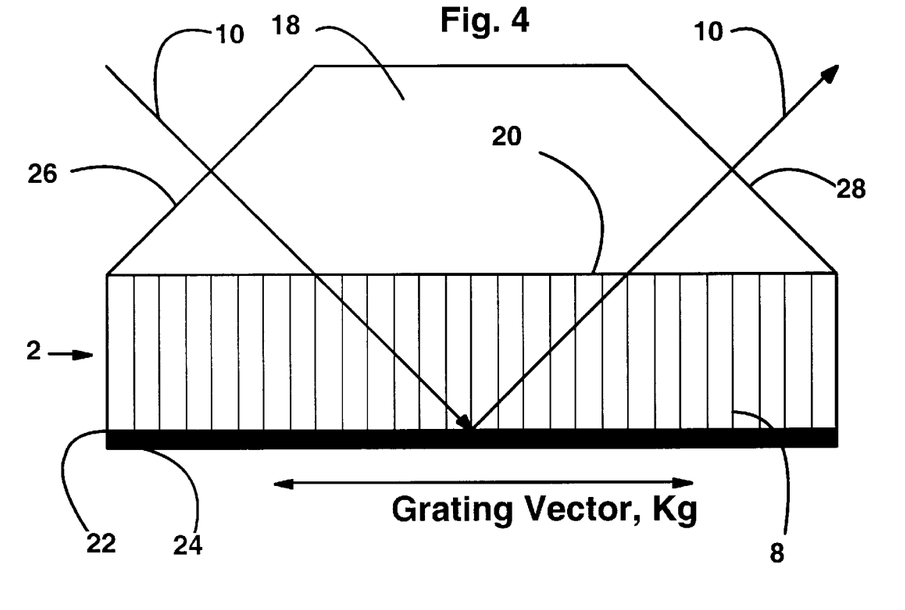
FIG. 4 shows prism-capped face pumping of a periodically poled plate

A particular embodiment called a prism-capped plate is shown in FIG. 4. A prism 18 is bonded to a top surface 20 of periodically poled plate 2. The domain boundaries 8 are represented with lines and the arrows 6 representing the poled domain polarizations as in FIG. 3 are omitted for clarity.

It is noted that the prism material and bonding method should be selected such that there is minimal reflection, absorption, or loss at the prism-plate boundary. The prism 18 can be made of the same material as the plate or of a material with a similar index of refraction as the plate. The bonding method should be selected to minimize reflection, absorption and loss at the prism plate boundary. Applicable techniques such as cementing, optical contacting, and diffusion bonding are well known in the art. Cementing will result in greater reflections than diffusion bonding and may lower the damage threshold of the device. Standard diffusion bonding techniques will provide optical contact with little reflection and a substantially unchanged damage threshold.

The bottom surface 22 of the device in FIG. 4 is shown with a reflective element 24 such as a mirror. This reflective element 24 is optional for certain geometries because satisfactory reflections can be obtained by total internal reflection from the bottom surface 22. Total internal reflection requires that the bottom surface 22 be clean or coated with a thick layer of low refractive index material. The prism 18 provides the entrance 26 and exit 28 windows which can have antireflection coatings to reduce reflection losses. In a preferred embodiment, the prism 18 is constructed such that a light beam 10 incident upon the entrance window 26 at normal incidence is then incident upon the bottom surface 22 at an angle greater than the total internal reflection critical angle. Another embodiment is arranged such that light 10 enters the entrance window 26 at Brewster's angle and is then incident upon the bottom surface 22 at an angle greater than the total internal reflection critical angle. This provides for reflection free transmission into the prism 18 for a certain polarization of light. Restricting this benefit to one polarization is not a great handicap because most light sources used with these devices are highly polarized. In principle light 10 can enter the prism 18 at any angle.

Prism-capped face pumping provides increased usable aperture size and therefore higher power handling because the light beam 10 is spread over a larger area of the plate 2. This geometry takes advantage of the ability of the electric field poling technique to pattern large surface area plates 2. The angle between the grating vector 14 and light beam 10 can be made small enough such that the increased aperture size compensates for the loss in NLO effect due to the light beam 10 not propagating exactly parallel with the grating vector 14.

Figure 5:
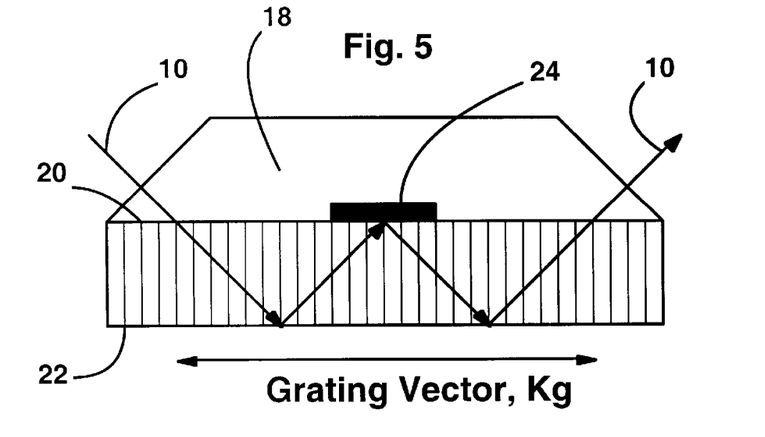
FIG. 5 shows prism-capped face pumping with an additional reflection.

Another embodiment of prism-capped face pumping is shown in FIG. 5. Here, the light beam 10 reflects from the bottom surface 22 twice, increasing the path length through the plate 2 and somewhat decreasing the available aperture size from the embodiment shown in FIG. 4. An increased path length through the plate 2 results in an increased NLO effect. A reflective element 24 located between the prism 18 and top surface 20 of the plate 2 is necessary to reflect the light beam 10 back towards the bottom surface 22.

Figure 6:
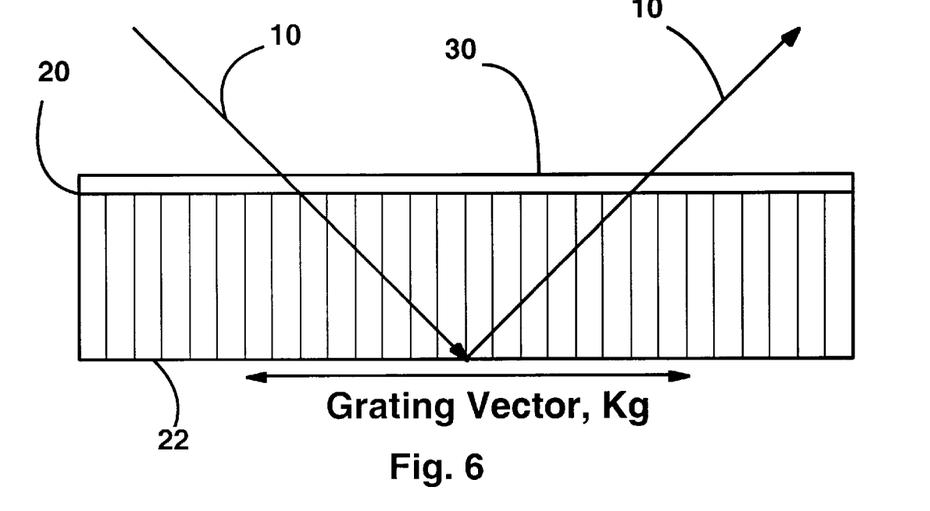
FIG. 6 shows face pumping of an anti-reflection coated periodically poled plate.

An embodiment of this invention similar in function to the prism-capped plate is shown in FIG. 6. This embodiment uses a thin film antireflection coating 30 on the top surface 20 of the plate 2 to allow the light beam 10 to enter the plate 2 with reduced reflection losses. The design of the coating 30 will depend on the reflection loss tolerance, the wavelength of light, and the angle of entry of the light beam 10. This embodiment can only be used with the specific chosen wavelengths and incident angles for which the coating 30 is designed.

Figure 7:
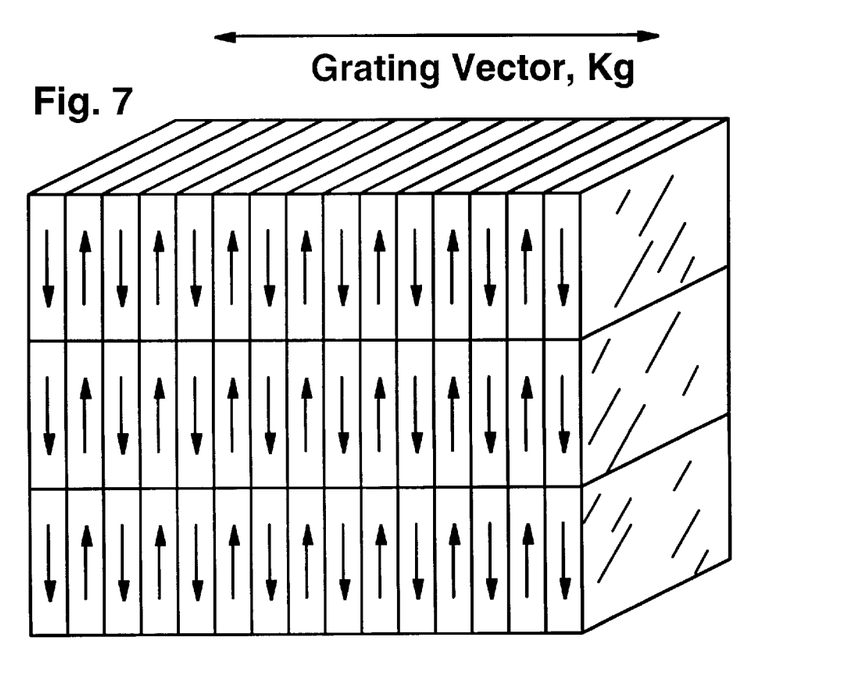
FIG. 7 shows a stack of periodically poled plates where each plate has the same poled pattern.

The preferred embodiment of the present invention is shown in FIG. 7. It is a stack of patterned poled plates 2 stacked with the top 20 and bottom 22 surfaces of the plates 2 bonded to one another. Such a stack will offer greatly increased aperture size while still allowing the input light beam to travel parallel with the grating vector 14. The aperture size will be increased over a single plate by a factor equal to the number of plates in the stack. This embodiment preserves the benefits of electric field poling (e.g. planar processing geometry, compatibility with microlithography) while providing larger apertures and power handling capability and the ability to pattern the NLO material throughout.

The number of plates that can comprise a stack is not limited in the present invention. Also, the present invention is not limited to stacks with periodically poled domain structures. It will be obvious to one skilled in the art that plates with different poled domain structures can be stacked to make a variety of NLO devices with increased aperture size, increased power handling capability, and other advantages. For example, the present invention can be applied to plate stacks with periodic gratings with variable periods, gratings with curved domains, or other structures.

Figure 8:
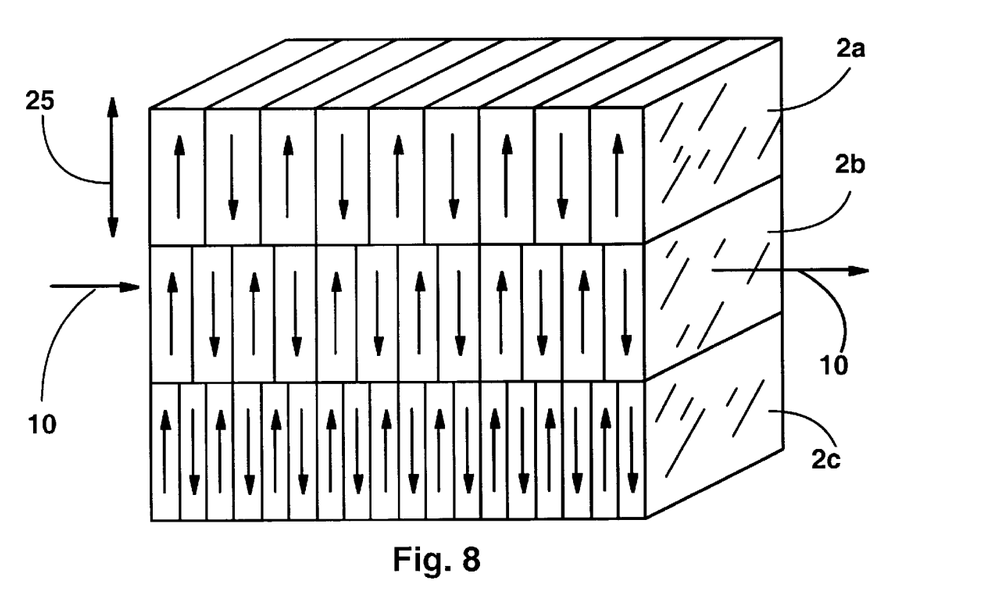
FIG. 8 shows a stack of periodically poled plates where each plate has a different poling period.
Figure 9:
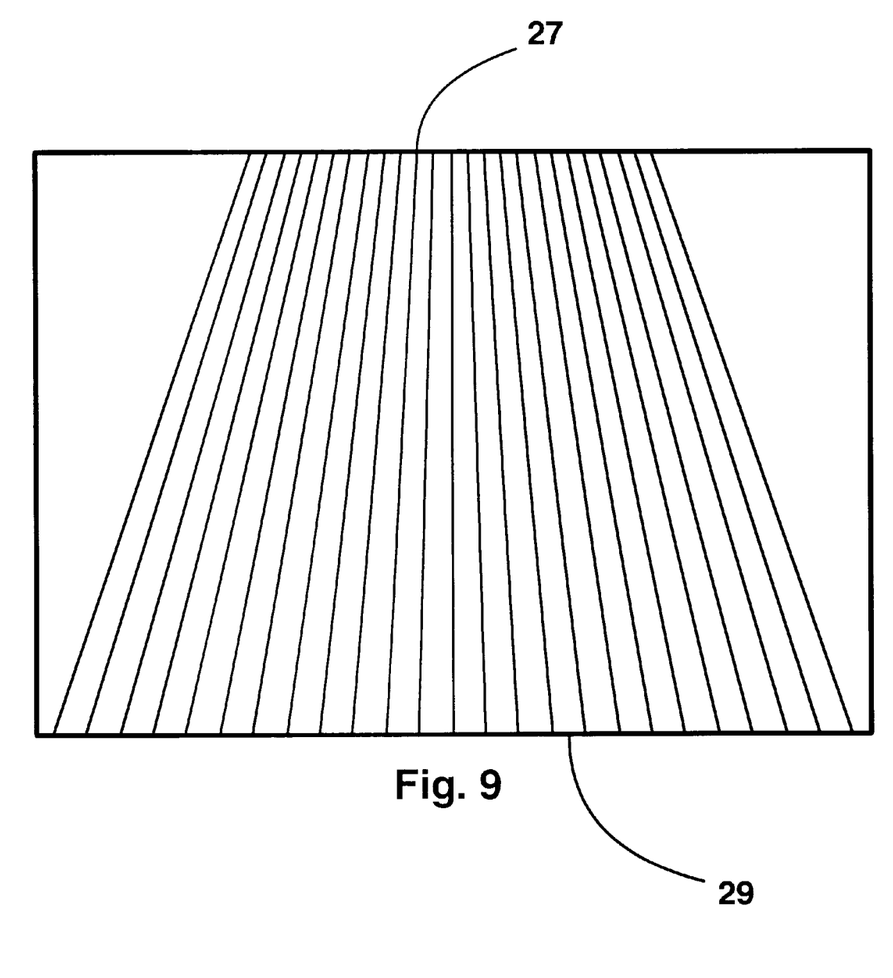
FIG. 9 shows a top view of a single plate with a variable grating period.

FIG. 8 illustrates how each plate 2a, 2b, 2c can be periodically poled with a different poling period. This device could be used to simultaneously produce multiple wavelengths of light from a single monochromatic input pump beam 10. Also, this stack could be tuned to a particular input beam 10 by moving the stack transversely 25 with respect to the input beam 10 until the beam 10 propagates through a region of the stack with the appropriate grating period. Alternatively, each plate can be poled with a period that varies laterally. A top view of such a plate is shown in FIG. 9. Lines indicate the domain boundaries. The grating period on one side 27 is shorter than the grating period on the other side 29.

Figure 10:
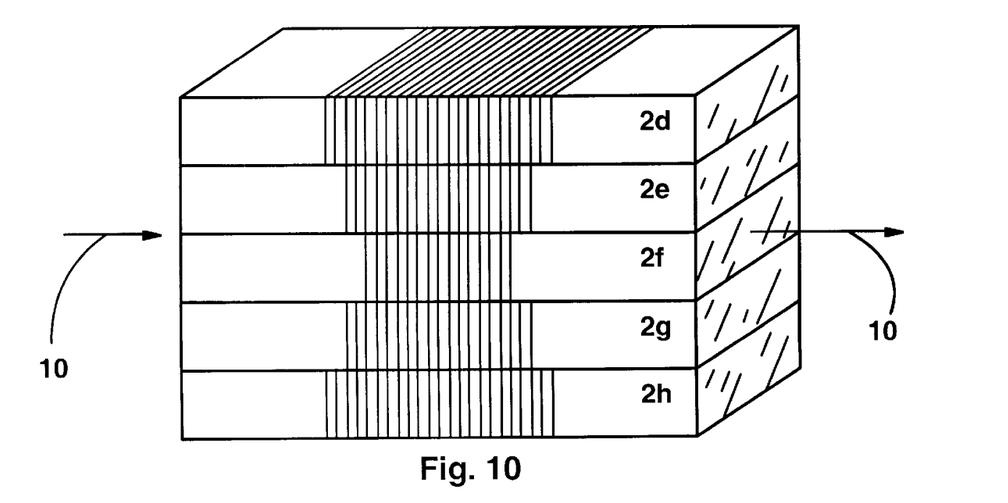
FIG. 10 shows a stack of periodically poled plates with a spatially tailored grating.

Due to the nonlinear nature of NLO effects, the energy profile of the input beam may not be the same as the energy profile of the output beam. For example, an input beam with a gaussian energy profile can produce a frequency converted beam with an irregular nongaussian profile. This can occur even if the patterning is periodic and uniform. This nonlinear effect is well known in the art and is undesirable in many applications. A solution is to provide the stack with a spatially tailored grating distribution. FIG. 10 shows a side view of a stack with a spatially tailored grating. Each plate 2d, 2e, 2f, 2g, 2h has a periodic grating of a different length. The middle of the stack has a short grating and is designed to interact with the center of an input beam where the input light intensity is greatest. The regions surrounding the middle have longer gratings to produce a stronger NLO effect where the input light is weaker. The result is an output beam with a predetermined energy profile. It is also possible to spatially tailor the grating in each plate. Since the magnitude of the NLO effect is nonlinear, the grating length profile required for a desired output beam profile will depend upon the input beam profile and the NLO material in a complicated fashion.

Figure 11:
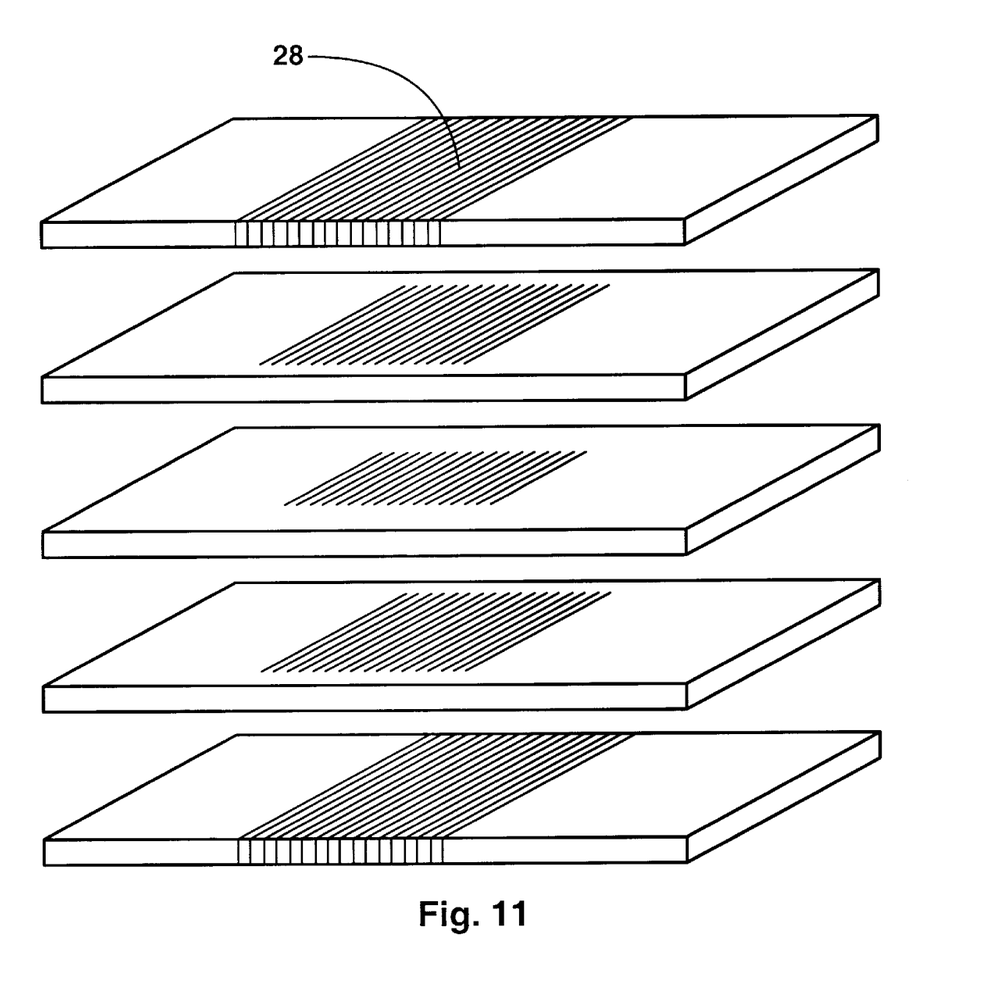
FIG. 11 shows an exploded view of a stack of periodically poled plates which can form a stack with three-dimensional patterning.

The present invention also includes the possibility of fabricating arbitrary three-dimensional patterns as illustrated in the exploded view of FIG. 11. The exploded view allows the patterned regions 28 on each plate to be seen. The domain patterns on each plate can be periodic or nonperiodic, curved or straight, and may or may not be continuous across the plate boundaries when the plates are bonded.

In the case of identically patterned plates, the plates 2 can be stacked, aligned and bonded with the poled domains 16 continuous across the plate boundaries 32. Generally, a patterned NLO device will exhibit superior performance if the poled regions are continuous across the plate boundaries. However, some NLO devices may preclude the alignment of the poled regions across plate boundaries. A stack with different grating periods for each plate is an example of this. It will be obvious to one skilled in the art whether or not continuous domain boundaries 32 are possible and necessary in a particular application.

Bonding can be done with optical cement or diffusion bonding Bonding with optical cement has the disadvantage that it may cause grazing incidence reflections at the plate boundaries 32. Such reflections would adversely affect the spatial mode of the optical beams produced. Also, certain cements have a damage threshold lower than the damage threshold of the NLO material of the plates 2, reducing the amount of power that can be handled by the device. Cements may also add loss to the NLO process which would lower efficiency and contribute to unwanted heating. Diffusion bonding does not suffer from these drawbacks, although grazing incidence reflections could still be a problem, depending on the bond quality. Diffusion bonding is the preferred bonding method.

In some applications care must be taken during assembly of a stack to make sure the plates 2 are aligned with the poled regions continuous across the plate boundaries. The phase coherence of periodically poled plates 2, for example, should be maintained. Mathematical analysis and numerical modeling have shown that the misalignment tolerance for periodically poled plates should be kept within ¼period to maintain an acceptable efficiency. Better alignment results in better beam quality and higher conversion efficiency. Satisfactory alignment has been achieved in a diffusion bonded stack of 3 plates with a period length of 28.5 microns. The alignment and bonding process used for this stack is as follows:

1. Cut several identical pieces of unpoled single crystal $LiNbO_3$ approximately 1 cm×1 cm from a 1 mm thick plate. The optic axis 4 should be perpendicular to the plate, i.e., Z-cut.

2. Polish one edge to the two plate surfaces.

3. Align lithography to polished edges of the plates.

4. Pole all plates with established electric field poling processes.

5. Clean top 20 and bottom 22 surfaces of poled plates

6. Stack plates.

7. Align plates by pressing polished edges of each plate against common mechanical fiduciaries. One mechanical fiduciary may be used for each possible direction of misalignment.

8. Pyroelectric assisted optical contact of plates is accomplished by placing stacked and aligned plates on a hot plate at 100° C. for 5 minutes. The pyroelectric charge that develops on the plate surfaces attracts neighboring plates and facilitates intimate contact. The stack is then cooled to room temperature. The final bonding steps are performed before the pyroelectric charge dissipates (approximately ½ hour).

9. Diffusion bond plates by pressing plates together and baking in an oven at 875 Celsius for two hours.

10. Polish input and output faces of bonded stack.

It will be clear to one skilled in the art that the above embodiment may be altered in many ways without departing from the scope of the invention. For example, multiple reflections can be made from the top surface 20 of the plate 2 in the embodiment of FIG. 5. Also, it will be clear to one skilled in the art that the present invention applies equally well to NLO devices that are made using techniques other than electric field poling but are nonetheless available in limited thickness. Further, the present invention can provide structures with three dimensional patterning regardless of plate thickness. Accordingly, the scope of the invention should be determined by the following claims and their legal equivalents.

What is claimed is:

1. An optical frequency converter comprising n patterned poled plates of NLO material, wherein n is a number greater than one, wherein each said plate comprises a poled pattern with a plurality of domain boundaries; and wherein said plates are bonded together by n-1 diffusion bonds to form a stack.

2. The optical frequency converter of claim 1 wherein said domain boundaries are substantially continuous across said bonds.

3. The optical frequency converter of claim 1 wherein said plates are periodically poled.

4. The optical frequency converter of claim 3 wherein grating vectors of said plates are parallel.

5. The optical frequency converter of claim 3 wherein grating vectors of said plates are not parallel.

6. The optical frequency converter of claim 3 wherein said plates have different grating periods.

7. The optical frequency converter of claim 1 wherein said stack has a spatially tailored grating distribution.

8. The optical frequency converter of claim 1 wherein said plates have different poled patterns.

9. The optical frequency converter of claim 1, wherein said stack comprises a top surface and a bottom surface, and wherein said optical frequency converter further comprises an anti-reflection coating on at least one of said surfaces.

10. The optical frequency converter of claim 1, further comprising a prism diffusion-bonded to a top surface of said stack, said prism providing an entrance window and an exit window.

11. The optical frequency converter of claim 10, wherein light entering said entrance window passes through said top surface into said stack, reflects from a bottom surface of said stack, exits said stack through said top surface, and exits said prism through said exit window.

* * * * *